United States Patent
Polimón Olabarrieta et al.

(10) Patent No.: US 10,400,416 B2
(45) Date of Patent: Sep. 3, 2019

(54) AUTONOMOUS ANCHORING METHOD AND SYSTEM FOR FOUNDATIONS OF OFFSHORE STRUCTURES

(71) Applicant: DRACE INFRAESTRUCTURAS, S.A., Madrid (ES)

(72) Inventors: Carlos Jesús Polimón Olabarrieta, Madrid (ES); Miguel Eguiagaray Garcia, Madrid (ES); Rafael Molina Sanchez, Madrid (ES); Miguel Angel Cabrerizo Morales, Madrid (ES); Alberto Rodriguez Moreno, Madrid (ES)

(73) Assignee: DRACE INFRAESTRUCTURAS, S.A., Madrid (ES)

( * ) Notice: Subject to any disclaimer, the term of this patent is extended or adjusted under 35 U.S.C. 154(b) by 109 days.

(21) Appl. No.: 15/324,504

(22) PCT Filed: Jul. 10, 2014

(86) PCT No.: PCT/ES2014/070566
§ 371 (c)(1),
(2) Date: Jan. 6, 2017

(87) PCT Pub. No.: WO2016/005617
PCT Pub. Date: Jan. 14, 2016

(65) Prior Publication Data
US 2018/0179723 A1    Jun. 28, 2018

(51) Int. Cl.
*E02D 27/52* (2006.01)
*E02B 17/02* (2006.01)
(Continued)

(52) U.S. Cl.
CPC .............. *E02D 27/52* (2013.01); *E02B 17/02* (2013.01); *E02B 17/025* (2013.01); *E02D 27/42* (2013.01);
(Continued)

(58) Field of Classification Search
CPC combination set(s) only.
See application file for complete search history.

(56) References Cited

U.S. PATENT DOCUMENTS

| | | |
|---|---|---|
| 2011/0158751 A1 | 6/2011 | Ohkubo et al. |
| 2012/0183359 A1 | 7/2012 | Nordstrom et al. |

(Continued)

FOREIGN PATENT DOCUMENTS

| | | |
|---|---|---|
| EP | 2309063 A1 | 4/2011 |
| ES | 2415058 A2 | 7/2013 |

(Continued)

OTHER PUBLICATIONS

International Search Report for PCT/ES2014/070566 dated Mar. 20, 2015.

*Primary Examiner* — Kyle Armstrong
(74) *Attorney, Agent, or Firm* — Brown & Michaels, PC

(57) ABSTRACT

A method for the autonomous anchoring of foundations for offshore structures consisting of a self-floating concrete caisson manufactured in a floating dock, capable of being towed to their final location, provided with internal vertical cells, which are divided into cells that are interconnected with each other and equipped with emptying and filling devices that allow the regulation of the ballast level for anchoring when they are filled with seawater. This method comprises the following stages: constraining the foundation, fastening and mooring by at least three tugboats pulling radially on the foundation to be anchored from at least 3 different directions; connecting the different sensors needed for controlling the operation with a control unit; gradual and controlled sinking of the foundation until it reaches its position of installation on the seabed; and final ballasting of the foundation.

9 Claims, 4 Drawing Sheets

(51) Int. Cl.
    *E02D 27/42*         (2006.01)
    *G01S 19/01*         (2010.01)
    *G01S 19/14*         (2010.01)
    *G01S 19/43*         (2010.01)
    *E02B 17/00*         (2006.01)

(52) U.S. Cl.
    CPC ....... *G01S 19/01* (2013.01); *E02B 2017/0039* (2013.01); *E02B 2017/0069* (2013.01); *E02D 2600/10* (2013.01); *G01S 19/14* (2013.01); *G01S 19/43* (2013.01)

(56) References Cited

U.S. PATENT DOCUMENTS

2016/0063709 A1*   3/2016   Booij .................... H04N 7/183
                                                                             348/142
2016/0230746 A1*   8/2016   Dagher .................. F03D 13/10

FOREIGN PATENT DOCUMENTS

| WO | 0134977 A1 | 5/2001 |
|---|---|---|
| WO | 2004087494 A2 | 10/2004 |
| WO | 2013157958 A1 | 10/2013 |

\* cited by examiner

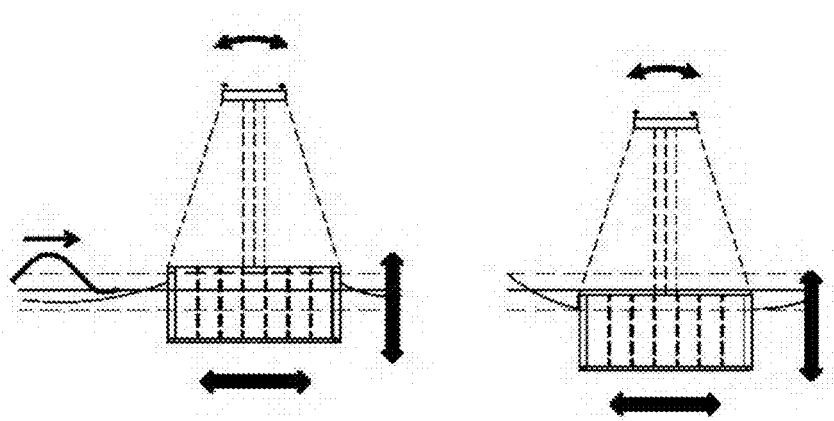
Fig. 5.1    Fig. 5.2
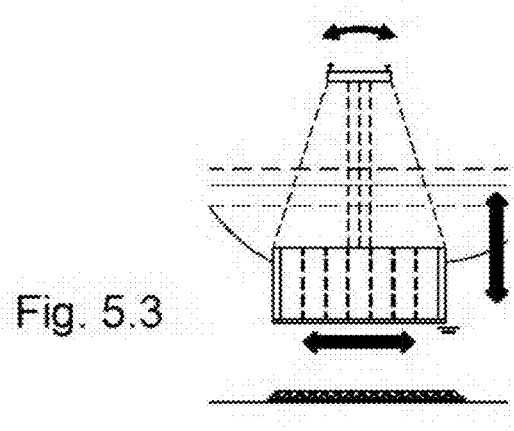
Fig. 5.3
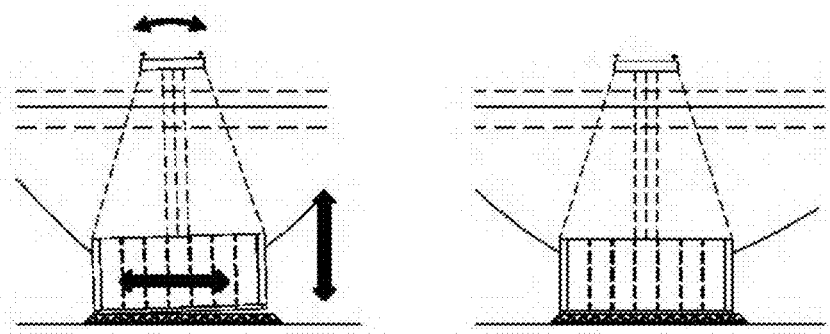
Fig. 5.4    Fig. 5.5

AUTONOMOUS ANCHORING METHOD AND SYSTEM FOR FOUNDATIONS OF OFFSHORE STRUCTURES

BACKGROUND OF THE INVENTION

Field of the Invention

The present invention relates to a method for the autonomous anchoring of foundations for offshore structures, which allows automatic control of the positioning of the structure by means of a system using sensor, control and communication modules.

Description of Related Art

Gravity foundations of offshore structures can be subdivided into two groups, which are distinguished by the way in which they are transported to their final emplacement, i.e., floating and non-floating foundations. Floating foundations differ from non-floating foundations in that they have the capacity of being towed, thus reducing the costs involved in this stage of the project. Currently, both types of foundations require special means, with a great capacity for load handling, in order to carry out their anchoring and final positioning. In other words, they are not autonomous in their functional transition between floating element, during the transport stage, and gravity foundation, during the service stage.

Within the framework of floating gravity foundations, there is a subtype composed of a watertight concrete caisson on which the emerged superstructure is arranged, which will serve as a support for the industrial activity (wind turbines, meteorological towers, etc.). The concrete caisson is lightened with rectangular or circular internal cells interconnected with each other. The cells are equipped with filling and emptying devices, enabling ballast control for final anchorage. For example, document ES 2 452 933 describes a gravity foundation for offshore wind turbines based on the use of three hollow and reinforced concrete bases that incorporate a valve system for filling and emptying the water inside it as ballast. These three concrete bases are joined by means of a metal structure in the shape of a tripod having sufficient height to emerge from the free surface of the water. The tower of the wind turbine will be connected to this metal structure by means of an extension piece of the shaft, located above sea level, and in which the berthing area, the stairs and the maintenance platform are installed.

Within the port community, anchoring operations of partially-emerged concrete caissons are a well-known and commonly used maritime operation in the construction of seawalls. This involves the monitoring of a large number of climatic and operational variables as well as the response of the floating element itself. Four fundamental elements are involved: the floating gravity foundation to be anchored, tugboats, a positioning network and a coordinate reference system external to the element. These anchoring operations are aimed at positioning the structure with level tolerances of between 25 and 50 cm.

The control of this positioning is usually carried out by fixing the caisson to fixed points such as previously anchored structures or mooring points in other structures and using auxiliary vessels (tugboats), which, anchored to the seabed, take action by means of pulling elements in order to direct the positioning. The different stages of the anchoring operation are carried out by means of the ballasting of the internal cells and the consequent progressive reduction of the freeboard. When the caisson reaches the seabed, its final position is verified and all the cells are filled until the foundation is totally installed on the seabed, leaving the caisson partially emerged in its final location.

The subtype composed of a watertight concrete caisson could become fully functional if it were given self-anchoring capacity, or autonomy in the process of transition between floating element and gravity foundation. Thus, the final commissioning process, at its final emplacement, would not require the use of special maritime means, which have high mobilization costs and limited availability in the shipping sector.

The problem that arises when it comes to anchoring foundations for offshore structures, which have to be completely submerged several meters below sea level consists in being able to control the final stage of anchoring, i.e., from the moment the caisson is totally submerged until it smoothly settles in its final location without having to place people on top of the caisson in order to control the maneuver and without using cranes or similar means for supporting the caisson throughout the progress of the proceedings, since it is a self-anchoring process.

Document WO 0134977 (EP 1 228 310) describes a procedure for the installation of a marine wind turbine, which is fixed to a base that constitutes, together with the shaft, a ballast tank that fills with water until it is anchored to the seabed, being able to float and support the weight in the water when the ballast tank is empty. The transport of the wind turbine to the place of installation is carried out by means of a vessel, because, unlike the caisson of the present invention, in principle it does not float, and if it did, it would not have the stability necessary to be kept in vertical position and be towed from the shore to the place of installation. This document does not describe the way anchoring operations are carried out, but it is assumed that they are carried out with the help of a crane, since if the apparatus as a whole does not have the stability necessary to stay afloat, the only way to control the exact place of installation is by using this type of auxiliary means.

SUMMARY OF THE INVENTION

The present invention describes a method and a system for achieving the self-anchoring of floating dock-type foundations, capable of being towed to their final location, which consist of a self-floating concrete caisson, provided with internal vertical cells, closed at the top by means of a slab that covers all or almost all the cells in which it is divided, which are interconnected with each other and equipped with emptying and filling devices that allow the regulation of the ballast level for anchoring when they are filled with seawater, obtaining a margin of precision equivalent to that of other floating caissons used in the construction of docks that remain partially emerged, although in this case the foundation is totally submerged several meters below sea level.

Once the foundation has been towed to a place next to that of its installation, anchored and totally submerged, the method of anchoring comprises the following stages:

a) Constraining the foundation, which includes fastening and mooring by at least three tugboats pulling radially from at least 3 different directions, spaced apart at a similar angle, so that once the foundation is vertically located on its final installation site, it is kept in the same vertical position throughout the entire anchoring process.

b) The next stage comprises the connection of the entire anchoring system, which includes: connecting the different sensors needed for controlling the operation with a control unit receiving information therefrom. This unit is preferably located on the emerged platform of the foundation that remains above sea level once the foundation has been totally anchored. Said unit integrates means of communication with the directional system between the tugboats, and means of communication between the GPS stations and a fixed GPS reference base located at a fixed point next to the installation location of the foundation. This control unit will also be associated to decision-making support equipment, which enables an operator to visualize and control the anchoring process as well as modify parameters of the process or detain it in the event of failure.

c) Once the necessary means of control have been installed, the gradual and controlled sinking of the foundation is begun until it is slowly submerged. The critical point of this process occurs when the foundation remains in balanced position under the water. From this point on, the anchoring is continued until it gently reaches its position of installation on the seabed.

d) When the foundation is placed on the seabed, its final ballasting takes place, flooding all the cells which incorporates the foundation and subsequently the tugboat lines are disengaged, concluding the operation.

The sinking process of the cells is gradual and is carried out in groups of cells that are next to each other, in a controlled manner, either through control software or manually, using the greater or lesser filling of an area or areas of the foundation in order to achieve tilting and, in this way, displacement or rotation in a determined direction. The foundation can also be moved or rotated slightly until relocating it vertically at its final installation site through the tension of the tug lines of the different tugboats. These operations are carried out at any time during the anchoring process, regardless of the position of the foundation, even when it is totally submerged, while it has not reached the position of its final emplacement.

Anchoring speed can be modified by varying the filling rate of the cells of the foundation with seawater.

Despite the random nature of the factors involved in the anchoring method, this system is autonomous to the extent that it is capable of making decisions in a systematic way, thus providing repeatability. This way, the floating object is capable of managing its own commissioning and, therefore, necessary maritime resources, such as anchoring support, are minimal and installation costs are also lower.

The system also provides reliability to foundation installation operations through the definition of quality parameters (operational threshold values) that the system itself ensures are not exceeded. This is the very reason it is an autonomous system that does not need the support of high-level maritime resources. The floating object itself can behave like a vessel.

Dynamic float control is required during the different stages of anchoring described previously in order to provide the foundation with self-anchoring capacity supervised by an expert operator. To this end, operation security and reliability criteria are fixed in terms of operational thresholds. The variables that define the reliability and the security of the operation are:

the heel and/or maximum trim of the structure during each anchoring stage.

the speed and/or maximum admissible acceleration of the same, or of the elements carried on the superstructure.

Similarly, the final installation process of the structure must be carried out minimizing the probability of impacts of the structure with the seabed and facilitating the final positioning according to project tolerances.

The proposed solution for the anchoring system consists of a system made up of 4 subsystems that allow the autonomous anchoring of floating gravity foundations and their positioning on the seabed:

An assembly of sensors that measure different variables in the foundation.

A control unit which receives the signals from the sensors on the position of the foundation and controls the valves and other means of filling the floating caisson, as well as the corrections that these have to make and the tugboats.

Means of communication between the different pieces of equipment.

User interface for decision-making support and the execution of different control instructions to said control unit.

The different sensors fulfill the following functions through the elements that make them up:

Measuring the level of ballast in cell groups: level sensors.

Measuring interior air pressure in the cells: pressure sensors.

Measuring the rotations that take place: a gyroscope.

Determining the absolute position of the structure: positioning sensor.

Determining the relative position of the structure with respect to the installation surface of the same: pressure sensors and positioning sensors.

Measuring the vertical heave and the inertial response: heave sensor.

Recording the accelerations and rates that structural elements undergo: accelerometer.

Detecting contact of the structure with the seabed, as well as possible impacts on other structures: accelerometer and gyroscope.

Measuring local conditions of marine environment forcing (measuring sea level, surge and currents): Surface (or underwater) Doppler Acoustic sensor.

The control equipment directs and regulates the following variables through the elements which integrate it:

Input and output of the liquid ballast in groups of cells, ballast and de-ballast valves, as well as submersible de-ballasting pumps and ballast level sensors.

Interior pressure in the cells: vent valves.

Horizontal position of the structure (on a ground plan): winches of the tugboats.

Dynamic control or trim and heel (rotations): filling valves.

Dynamic control of the installation of the structure on the seabed: filling valves.

Relative position with respect to the installation surface of the same (distance to the seabed): filling valves Vertical heave and its inertial response.

Inertial response of the structural elements that it may transport or carry: accelerometer and gyroscope.

Possible impacts on other structures, marine environments or the seabed: Accelerometer and gyroscope.

Contact of the structure with the seabed: Accelerometer and gyroscope.

Actuator control unit.

The system incorporates several means of communication:

Receiver unit for sensor information located on the emerged platform of the foundation.

Wireless directional system (Wi-Fi) between the vessels intended as control centers and the receiver and control unit for information from the sensors located on the foundation.

UHF communication system between GPS stations and the GPS-RTK base (fixed reference point).

Communication system between the sensing and control units.

The user interface that serves as decision-making support consists of the following elements:

Visualization of sensory variables and control (status).

Pre-programming of the sequence of operations (opening valves and voltages in the winches of the vessels) and of the operational thresholds by stages of anchoring, which act as indicators of the quality of the operation (admissible angles of heel and trim, sink speed of the gravity foundation, acceleration in the elements that make up the superstructure).

Visualization of the progress of each of the operational status variables recorded by the sensing and control subsystem during the stages of anchoring: submerging, anchoring, contact, installation on the seabed, installation and final ballasting.

Offset (zeros of the reference system of the sensing and control subsystem).

Automatic correction of thresholds.

Manual intervention in the operation.

List of automatic actions and those derived from manual intervention.

Instrumental alarm for exceedances of operational thresholds and system operations status.

Cross check for the start of a new stage or restart after operational shutdowns.

The system logically incorporates power supply units (3) consisting of an electric energy generating system and a compressor.

The novelties of this system for anchoring are:

Autonomy in the development of the operation since it enables anchoring in a totally automatic way, allowing potential human intervention if necessary.

It is reliable since it controls and limits the exceedances of operational thresholds in an autonomous way.

It allows the visualization of the status of the parameters that define the anchoring operation in real time and at all times.

It allows the control of all the processes involved in the operation in real time.

The interface shows the processes of the installation with the status and situation of the elements, so that the operator receives feedback-guaranteeing functionality.

The system is conceived such that it enables anchoring in a totally automatic way, with minimum human intervention, and only if needed.

It does not require the use of either heavy lift or singular vessels for the installation.

BRIEF DESCRIPTION OF THE DRAWING

In order to complement the description presented herein, and with the aim of gaining a better understanding of the characteristics of the invention, a set of drawings is attached to this specification, wherein, by way of non-limiting examples, the following has been represented.

The foundation to be anchored (1).

The tugboats (2).

The positioning system (3).

The platform or fixed point of reference for the reference system (4).

Figure 3:
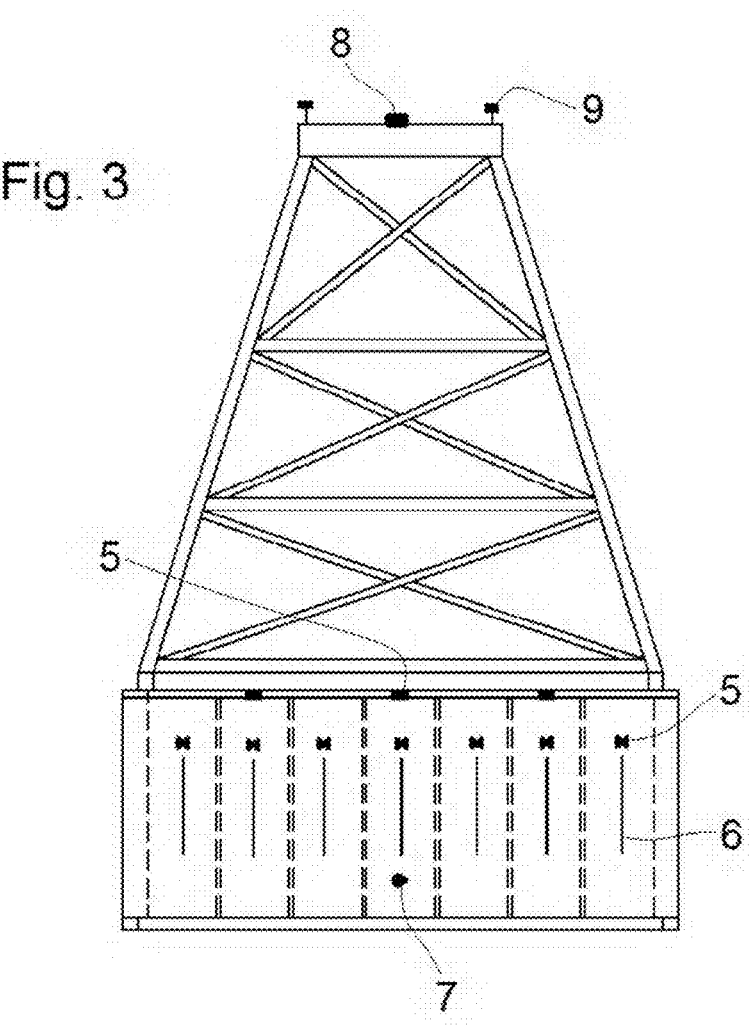

FIG. 3 shows an elevation of a foundation with a structure in whose upper area the wind turbine or the meteorological station will be fixed and on which the most important sensing and control elements, arranged on the object to be anchored, have been pointed out:

Valves (5)

Filling level sensors (pressure sensors) (6)

Submersible pumps (7)

Accelerometer-gyroscope (8)

GPS-RTK antennas (9)

Figure 4:
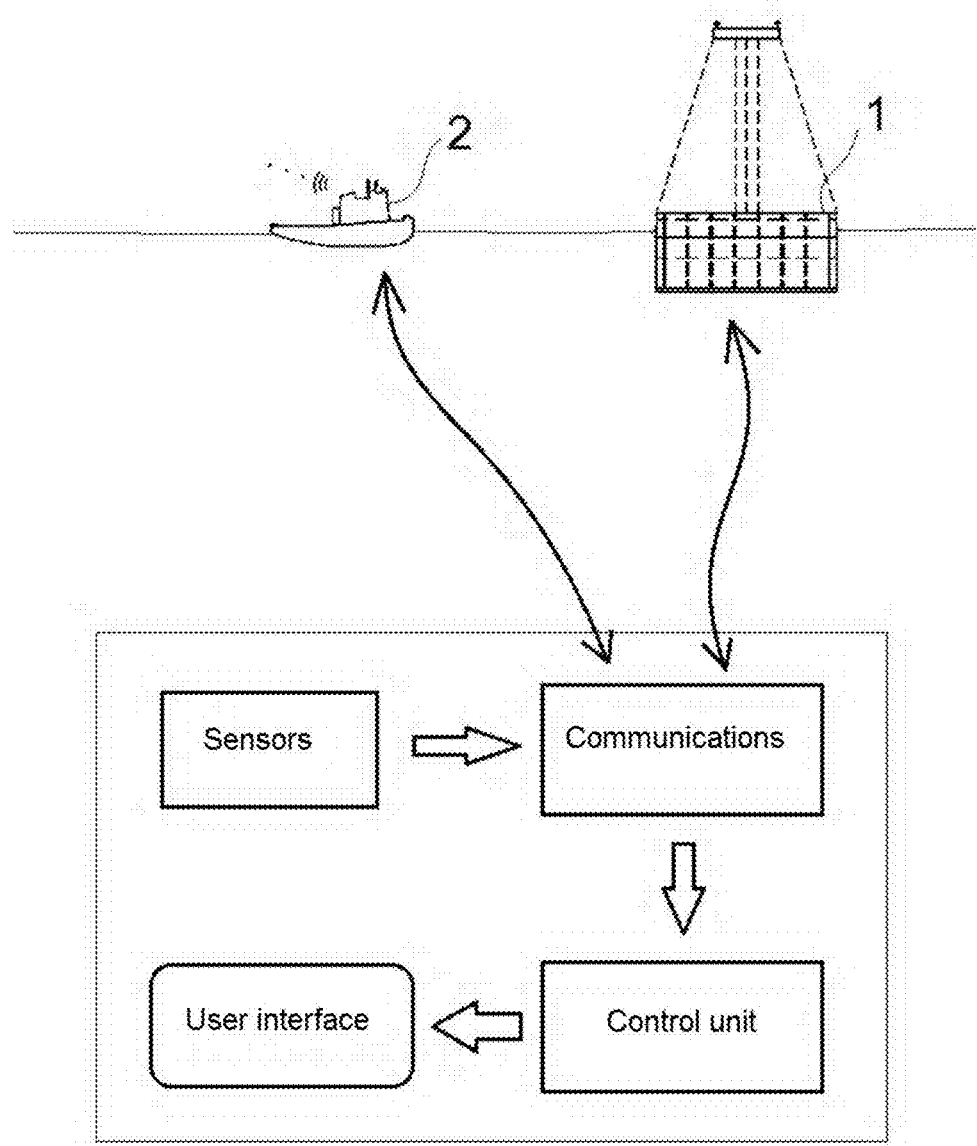

FIG. 4 shows a general flowchart of the autonomous anchoring system.

FIG. 5 offers a schematic representation of the main stages of anchoring operations.

DETAILED DESCRIPTION OF THE INVENTION

Figure 2:
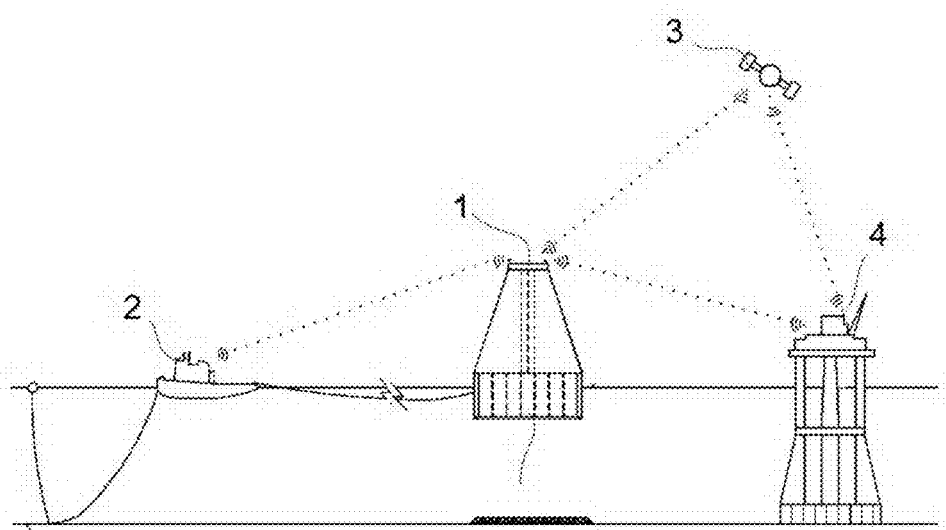
FIG. 2 shows the elements involved in the anchoring system, wherein the following can be distinguished.

The proposed system for anchoring integrates its different elements into the equipment comprising the assembly of the same: tugboats (2), foundation to be anchored (1), base platform or fixed point of reference (4) and positioning network (3): see FIG. 2).

The user interface consisting of a command control server or SCADA (Supervisory Control And Data Acquisition) system is installed in the tugboats (2), which system enables remote visualization, monitoring and control of the process. It is a closed loop system, i.e., it adjusts the control through feedback of the output signal. An 8-port switch, two modems for wireless communication and at least two CPUs and auxiliary screens are also installed in the tugboats (2), which enable the visualization of the status of the process variables by means of an interface. This interface has particular tabs for visualizing the position of the element to be installed, filling level of the cells, alarms, electrical parameters, tension in the mooring lines, etc. It also enables visualizing the status of the instrumentation such as the valves (5), pumps (7) and filling (6) and movement (accelerometer-gyroscope) sensors (8).

The control unit, preferably consisting of a PLC (Programmable Logic Controller) is installed in an electric cabinet on the foundation platform (1) that remains emerged, which in turn communicates with the command control system in the vessels by means of Wi-Fi modems.

The positioning equipment is be made up of an RTK reference base installed at a fixed reference point (3), a GPS-RTK antenna (9) installed on the foundation platform (1) that remains emerged and the accelerometer-gyroscope (8) also installed on the foundation platform (1).

The system controls the measurements carried out by the sensing subsystem, analyzes movement frequencies and filters them so that it can respond to them by setting new reference thresholds. Thus, it becomes independent from external factors: it turns into an autonomous anchoring system.

The system for autonomous anchoring is susceptible of industrial application in the offshore wind power and civil engineering sectors. While foundation construction may be more or less industrialized for mass production, the process of laying the foundation is largely depends on the capabilities of the operator due to the large number of variables involved in the operations and the uniqueness of the stages of anchoring.

FIG. 5 shows several stages of anchoring operations:
Constraint of the foundation, attaching, and connection to tugboats (FIG. 5.1)
Submerging (FIG. 5.2)
Sinking (FIG. 5.3)
Installation on the seabed (FIG. 5.4)
Final ballasting (FIG. 5.5)

Figure 1:
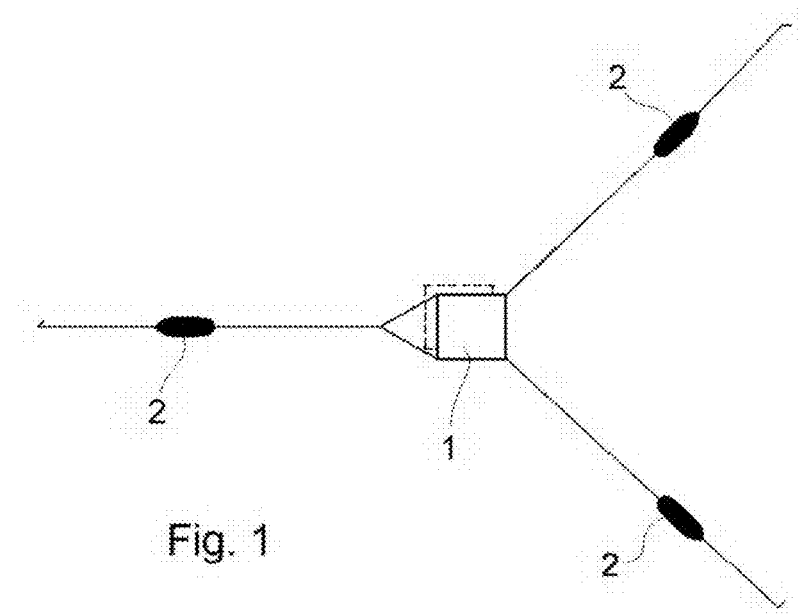
FIG. 1 shows the tugboat system (2) arranged in a layout for the installation of any given foundation (1).

In the stage of constraint of the foundation (1) at least three tugboats (2) are fastened and moored, which pull radially on the foundation to be anchored from at least 3 different directions, spaced apart at a similar angle, so that once it is located vertically on its final installation site, it is kept in the same position throughout the entire anchoring process. See FIG. 1.

Before or after the previous stage, the following connections are carried out:
The different sensors needed for controlling the operation.
The control unit, located above sea level on the emerged platform of the foundation.
The different communication equipment: with the directional system between the tugboats, between the GPS stations and with a fixed GPS reference base located at a fixed point next to the installation location of the foundation.
And the implementation of a decision-making support system, which enables visualizing and controlling the progress of the anchoring process.

Once all the instrumentation is installed and operating, and the tugboats (2) keep the cables that are pulling on the foundation (1) under tension, so that it is floating vertically on the point of the seabed on which it is to be installed, anchoring is carried out by gradually sinking the foundation, the whole process being controlled by the described system, until the foundation is slowly submerged (FIG. 5.2), remaining in neutral position below the water. Subsequently, the foundation continues to be anchored in a next to neutral seaworthy condition (FIG. 5.3) until it reaches its position of installation on the seabed (FIG. 5.4).

Finally the foundation is ballasted, all the cells contained in the foundation are flooded and the tugboat lines are disengaged (FIG. 5.5).

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method for autonomous anchoring of foundations for offshore structures, built on a floating dock and capable of being towed to a final location, consisting of a self-floating concrete caisson, provided with internal vertical cells, closed at a top by means of a slab that covers all or almost all cells in which the caisson is divided, which are interconnected with each other and equipped with emptying and filling devices that allow the regulation of the ballast level for anchoring when they are filled with seawater, comprising the following steps:
a) constraining the foundation, fastening and mooring with at least three tugboats pulling radially on the foundation to be anchored from at least 3 different directions, spaced apart at a similar angle, so that once the foundation is vertically located on its final installation site, it is kept in the same vertical position throughout the entire anchoring process;
b) connecting the different sensors needed for controlling the operation with a control unit receiving the information from said sensors, preferably located on the emerged platform of the foundation that remains above sea level once the foundation has been totally anchored, said control unit integrating means of communication with the directional system between the tugboats, and means of communication between a GPS station and a fixed GPS reference base located at a fixed point next to the installation location of the foundation; as well as the implementation of a decision-making support system, which enables visualizing and controlling the progress of the anchoring process;
c) gradual and controlled sinking of the foundation until it is slowly submerged, remaining in a neutral position under the water and subsequent anchoring of the same in a next to neutral seaworthy condition until it reaches its position of installation on the seabed;
d) final ballasting of the foundation, flooding of all the cells that the foundation incorporates and disengaging the tugboat lines.

2. The method, of claim 1, in which a filling of the cells of the foundation is carried out gradually, in groups of cells that are next to each other, in a controlled manner, either through control software or manually, using the greater or lesser filing of an area or areas of the foundation to achieve tilting and in this way controlling the heel and/or maximum trim of the structure during each stage of anchoring.

3. The method of claim 1, in which a tension of the tug lines of the different tugboats is controlled in order to cause displacement and thereby control a heel and/or maximum trim of the structure during each stage of anchoring.

4. The method of claim 1, in which a speed and a maximum acceleration of the sinking of the foundation is controlled by modifying a filling rate of the cells of the foundation with seawater.

5. A system for autonomous anchoring of foundations for offshore structures having automatic control and operation of gravity foundations, powered by an electric energy generating system and a compressor, comprising:
an assembly of sensors that measure different variables that affect the foundation, enabling to determine movements, a degree of filling of the cells that make up the foundation, as well as a position of the foundation with respect to what will be a final anchoring site of the foundation;
a control unit which receives signals from the sensors and from a position of a caisson at all times, the caisson conforming the foundation with respect to the location the control unit controlling a valve and other means of filling the caisson and the necessary corrections of said means of filling as well as the direction and the tension with which a tugboat pulls radially on the foundation to be anchored from at least 3 different directions spaced apart at a similar angle; such that the foundation gradually sinks until the foundation lies on a seabed in the final anchoring site;
a means of communication between different pieces of equipment receiving information from the sensors, from a GPS station located on the foundation and from a fixed GPS reference station located at a fixed point next to the final anchoring site of the foundation, the different pieces of equipment, the GPS station, and the fixed GPS reference station communicating information to the control unit; and
a user interface for decision-making support and the execution of different control instructions to said control unit, including means for visualizing the variables and progress of the operation, software in which sequence programming actions are implemented, and means that enable manual intervention in the operation.

6. The system according to claim 5, in which the sensors of the system fulfill the following functions:
measuring the level of ballast in cell groups;
measuring the interior air pressure in the cells;
measuring the rotations of a structure that take place;
determining the absolute position of the structure;
determining the relative position of the structure with respect to the surface on which it is installed;
measuring the vertical heave on the structure and the inertial response of the structure;
recording the accelerations and speed rates that structural elements undergo;
detecting contact of the structure with the seabed, as well as possible impacts on other structures; and
measuring local conditions of a marine environment.

7. The system of claim 5 in which the control unit directs and regulates the following variables through the elements that integrate it:
input and output of the liquid ballast in groups of cells;
interior pressure in the cells;
horizontal position of the structure (on a ground plan);
dynamic control of trim and heel (rotations);
dynamic control of structure installation on the seabed;
relative position with respect to the installation surface (distance to the seabed);
vertical heave and its inertial response;
inertial response of the structural elements that it may transport or carry;
possible impacts on other structures, marine environments or the seabed; and
contact of the structure with the seabed.

8. The system of claim 5, further comprising:
a receiver unit for information from the sensors located on the emerged platform of the foundation;
a wireless intercommunication unit (Wi-Fi) between the vessels intended as control centers and the receiver and control unit for information from the sensors located on the foundation;
a UHF communication system between GPS stations and the GPS-RTK base (fixed reference point); and
a means of communication between a sensing and control units.

9. The system of claim 5, in which the user interface comprises:
means for a visualization of sensory variables and control (status) and of the progress of each of the operational status variables recorded by the sensing and control subsystem during stages of anchoring;
software in which a sequence of operational actions (opening of valves and voltages in the winches of the vessels) and of operational threshold by stages of anchoring, as well as automatic correction of thresholds are implemented;
means that enable manual intervention on the operation;
means of warning for exceedances of operational threshold and system operations status; and
a status cross check for starting a new stage or restarting after operational shutdowns.

* * * * *